United States Patent [19]

Han et al.

[11] Patent Number: 5,122,578

[45] Date of Patent: Jun. 16, 1992

[54] POLYPHENYLENE ETHER-POLYARYLENE SULFIDE COMPOSITIONS

[75] Inventors: Choong Y. Han, Pittsfield, Mass.; Sterling B. Brown, Schenectady, N.Y.; Erik W. Walles, Rensselaer, N.Y.; Tohru Takekoshi, Scotia, N.Y.; Andrew J. Caruso, Schenectady, N.Y.

[73] Assignee: General Electric Company, Schenectady, N.Y.

[21] Appl. No.: 511,121

[22] Filed: Apr. 19, 1990

[51] Int. Cl.$^5$ .................. C08G 75/02; C08L 81/04
[52] U.S. Cl. .................. 525/537; 525/397; 525/525; 525/526
[58] Field of Search .............. 525/537, 525, 526, 397

[56] References Cited

U.S. PATENT DOCUMENTS

| | | | |
|---|---|---|---|
| 4,528,346 | 7/1985 | Sugie et al. | 525/430 |
| 4,605,713 | 8/1986 | Heitz et al. | 525/537 |
| 4,740,558 | 4/1988 | Mashita et al. | 525/397 |
| 4,769,424 | 9/1988 | Takekoshi et al. | 525/435 |
| 4,853,442 | 8/1989 | Nguyen | 525/471 |
| 4,980,415 | 12/1990 | Campbell | 525/68 |
| 5,015,703 | 5/1991 | Takekoshi et al. | 525/537 |
| 5,026,764 | 6/1991 | Okabe et al. | 525/537 |
| 5,041,504 | 8/1991 | Brown et al. | 525/397 |
| 5,068,286 | 11/1991 | Campbell et al. | 525/397 |

FOREIGN PATENT DOCUMENTS

| | | |
|---|---|---|
| 0347539 | 12/1989 | European Pat. Off. . |
| 0156561 | 12/1975 | Japan . |
| 5129422 | 10/1980 | Japan . |
| 9213758 | 12/1984 | Japan . |
| 2065351 | 3/1987 | Japan . |
| 2218996 | 11/1989 | United Kingdom . |

*Primary Examiner*—John C. Bleutge
*Assistant Examiner*—Helen F. Lee
*Attorney, Agent, or Firm*—William H. Pittman; James C. Davis, Jr.

[57] ABSTRACT

Compatible compositions comprising polyarylene sulfide-polyphenylene ether copolymers are prepared by the reaction of a polyphenylene ether containing epoxy groups, typically an epoxytriazine-capped polyphenylene ether, with a polyarylene sulfide containing epoxide-reactive functional groups, preferably amine groups. It is sometimes advantageous to anneal said compositions or molded articles prepared therefrom.

21 Claims, No Drawings

POLYPHENYLENE ETHER-POLYARYLENE SULFIDE COMPOSITIONS

This invention relates to the preparation of compatible polyarylene sulfide-polyphenylene ether compositions, and more particularly to the preparation of copolymer-containing compositions.

The polyphenylene ethers are a widely used class of thermoplastic engineering resins characterized by excellent hydrolytic stability, dimensional stability, toughness, heat resistance and dielectric properties. However, they are deficient in certain other properties such as solvent resistance.

For their part, polyarylene sulfides are crystalline engineering thermoplastics with high crystalline melting temperatures, typically on the order of 285° C., and are characterized by low flammability, high modulus and excellent resistance to aggressive chemicals and solvents. However, their glass transition temperatures are very low, typically as low as 85° C.; as a consequence, heat distortion temperatures are low in the absence of reinforcement with fillers such as glass fiber. In addition, polyarylene sulfides are very brittle, as evidenced by a tensile elongation for polyphenylene sulfide usually no greater than about 2.5% and frequently below 1%.

It might be expected that polyarylene sulfide-polyphenylene ether blends could be prepared which would have such properties as high solvent resistance, high heat distortion temperature, good ductility and resistance to flammability. However, blends of this type are incompatible and undergo phase separation and delamination, as a result of little or no phase interaction between the two resin phases. Molded parts made from such blends are typically characterized by low tensile and impact strength.

The present invention is based on the discovery that polyarylene sulfide-polyphenylene ether blends can be compatibilized by incorporating therein a copolymer of the two resins, and that copolymer-containing compositions may be readily prepared from polymers in which various functional groups have been incorporated. The invention provides polyarylene sulfide-polyphenylene ether compositions with improved properties, including high solvent resistance, ductility and relatively high heat distortion temperature.

Accordingly, the invention embraces compositions comprising polyphenylene ether-polyarylene sulfide copolymer molecules, said compositions being prepared by melt blending a polyphenylene ether containing epoxy groups with a polyarylene sulfide containing epoxide-reactive functional groups.

The polyphenylene ethers containing epoxy groups which are employed in the present invention may be prepared from polyphenylene ethers known in the art. The latter include numerous variations and modifications all of which are applicable to the present invention, including but not limited to those described hereinafter.

The polyphenylene ethers comprise a plurality of structural units having the formula

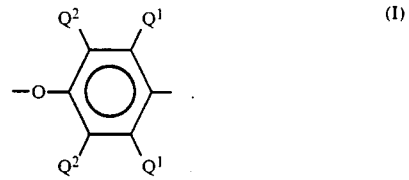

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications. Particularly useful polyphenylene ethers for the purposes of this invention are those which comprise molecules having at least one of the end groups of the formulas

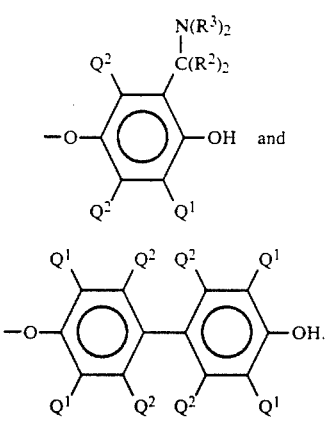

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

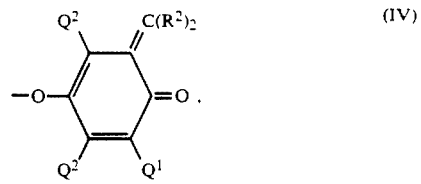

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

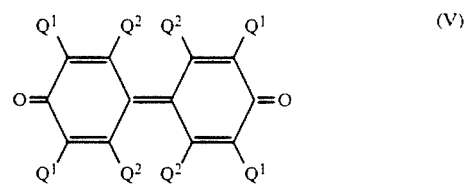

is present, especially in a copper halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

For the purposes of the present invention, it is essential for the polyphenylene ether to contain epoxy groups, which may be present in the form of end groups or substituents on the polymer chain. Examples of polymers in which the epoxy group is present in a substituent are the reaction products of polyphenylene ethers with glycidyl methacrylate and similar monomers, disclosed in PCT published application 87/07279. Epoxy-containing end groups are exemplified by the reaction products with terephthaloyl chloride and glycidol described in the same application, the polyphenylene ether-epichlorohydrin reaction products of U.S. Pat.

No. 4,460,743, and the epoxytriazine-capped polyphenylene ethers of European patent application 347,828. All of the above-mentioned patents and applications are incorporated by reference herein.

The epoxytriazine-capped polyphenylene ethers are particularly preferred for the purposes of this invention. They are characterized by the presence of end groups having the formula

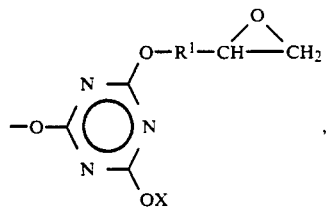

wherein X is an alkyl, cycloalkyl or aromatic radical or

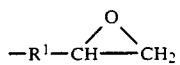

and $R^1$ is a divalent aliphatic, alicyclic, heterocyclic or unsubstituted or substituted aromatic hydrocarbon radical. The X value in formula VI may be an alkyl or cycloalkyl radical, typically lower alkyl and especially primary or secondary lower alkyl; an aromatic radical, typically monocyclic and containing 6-10 carbon atoms and especially an aromatic hydrocarbon radical; or a radical of formula VII. In formulas VI and VII, $R^1$ may be aliphatic, alicyclic, aromatic (including aromatic radicals containing art-recognized substituents) or heterocyclic. It is usually lower alkylene and especially methylene.

Such epoxytriazine-capped polyphenylene ethers may be prepared by contacting under reactive conditions, in the presence of a basic reagent, at least one polyphenylene ether with an epoxychlorotriazine of the formula

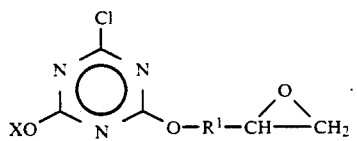

Typical epoxychlorotriazines of formula VIII include 2-chloro-4,6-diglycidoxy-1,3,5-triazine (hereinafter "DGCC"), 2-chloro-4-methoxy-6-glycidoxy-1,3,5-triazine, 2-chloro-4-(n-butoxy)-6-glycidoxy-1,3,5-triazine (hereinafter "BGCC") and 2-chloro-4-(2,4,6-trimethylphenoxy)-6-glycidoxy-1,3,5-triazine (hereinafter "MGCC"). These compounds may also be named as though derived from cyanuric acid and DGCC, BGCC and MGCC may be designated diglycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with n-butanol or mesitol. Cyanuric chloride and n-butyl dichlorocyanurate are both commercially available.

The reaction between the epoxytriazine and the polyphenylene ether may be conducted interfacially in a medium comprising water and a non-polar organic liquid. The basic reagent is a water-soluble base, typically an alkali metal hydroxide and preferably sodium hydroxide. It may added to the mixture of epoxychlorotriazine and polyphenylene ether, or may initially react with the polyphenylene ether to form a salt which is then contacted with the epoxychlorotriazine. There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically 2 or 3, contain about 5-20 carbon atoms.

Reaction temperatures in the range of about 20-100° C. may be employed. The amount of epoxychlorotriazine is typically in the range of about 1-6% and preferably about 2-6% by weight based on polyphenylene ether. Most often, the ratio of equivalents of base to moles of epoxychlorotriazine is about 0.5-1.5:1.

The epoxytriazine-capped polyphenylene ether may be isolated by conventional methods, typically by precipitation with a non-solvent. Among the non-solvents which may be employed are methanol, 1-propanol, acetone, acetonitrile and mixtures thereof.

When the non-solvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step.

The preparation of epoxytriazine-capped polyphenylene ethers useful in the present invention is illustrated by the following example.

EXAMPLE 1

To a solution in 2500 ml. of toluene of 400 grams of a poly(2,6-dimethyl-1,4-phenylene ether) having an intrinsic viscosity in chloroform at 25° C. of 0.40 dl./g. was added 19 ml. of a 10% aqueous sodium hydroxide solution, followed by 20 grams of MGCC dissolved in a small amount of methylene chloride and 48 grams of a 10% solution in toluene of a commercially available methyltrialkylammonium chloride in which the alkyl groups contain 8-10 carbon atoms. The mixture was stirred vigorously for 30 minutes, after which the product was precipitated with methanol in a blender and rapidly filtered, washed with methanol and vacuum dried. It was shown by proton nuclear magnetic resonance spectroscopy to contain about 1.5% (by weight) epoxytriazine moieties.

The polyarylene sulfides employed in the present invention are derived from known polymers containing arylene groups separated by sulfur atoms. They include polyphenylene sulfide (hereinafter sometimes designated "PPS") and substituted polyphenylene sulfides.

By reason of its availability and relatively low cost, PPS is often preferred. PPS is typically prepared by the reaction of p-dichlorobenzene with sodium sulfide, optionally with the use of a minor proportion of a branching agent such as 1,3,5-trichlorobenzene. Reference is made, for example, to U.S. Pat. No. 4,794,163, the disclosure of which is incorporated by reference herein for typical reagents and conditions employed in polyarylene sulfide preparation.

It is often impracticable to determine the molecular weight of a polyarylene sulfide, by reason of its insolubility in essentially all solvents used for molecular weight determination. Indirect characterization of relative molecular weight by melt flow characteristics is commonly employed. For the purposes of this invention, the melt flow characteristics of the polyarylene sulfide are not critical; values in the range of about 20–1000 g./10 min. (315° C., 5 kg. load) are typical.

For the purposes of this invention, it is necessary that the polyarylene sulfide contain epoxide-reactive functional groups. Typical groups within this definition are amino, carboxylic acid and thiol groups. They may be provided in a number of ways.

One of these, disclosed, for example, in U.S. Pat. No. 4,769,424, comprises the reaction of a dihalodiaryl sulfide with an alkali metal sulfide to form a halogen-terminated polyarylene sulfide, which then undergoes further reaction with a substituted thiophenol with elimination of hydrogen halide to form a polyarylene sulfide having the required substituents on the end groups. In another method, the polyarylene sulfide is prepared by the reaction of an alkali metal sulfide with a mixture of dichloroaromatic compounds and/or monochloroaromatic compounds (used as chain termination agents), including at least one such compound which contains the required functional group.

A third method, disclosed and claimed in copending application Ser. No. 07/373,080, is the reaction of a polyarylene sulfide with a disulfide containing the required functional groups, typically at temperatures in the range of about 225°–375° C., in the melt or in solution in a suitable high boiling solvent such as 1-chloronaphthalene. This method is illustrated by the following examples; the polyarylene sulfide employed therein was a cured PPS having a melt flow of 71 g./10 min. at 300° C. and 5 kg. load. All percentages are by weight.

EXAMPLE 2

An intimate mixture of 5 grams of PPS in fine powder form and 250 mg. of bis(4-aminophenyl) disulfide was purged with nitrogen, heated at 350° C. for 6 minutes with mechanical stirring and cooled. The product was dissolved in 15 ml. of 1-chloronaphthalene at 230° C., cooled to room temperature and extracted with chloroform in a Soxhlet extractor, leaving as the residue 4.81 grams (96% of theoretical) of a solid which was shown by Fourier transform infrared spectroscopy and elemental analysis to be the desired aminophenyl-terminated PPS, containing a proportion of amino functionality corresponding to 71% of the bis(4-aminophenyl) disulfide employed.

Three reactively capped PPS compositions were prepared using 1.52%, 0.5% and 0.1%, respectively, of bis(4-aminophenyl) disulfide. Preparation was by melt blending in a counterrotating twin screw extruder at 400 rpm., at temperatures in the range of 135°–302° C. The compositions prepared from 0.5% and 0.1% disulfide were easily stranded, affording somewhat brittle, wire-like strands. The composition prepared from 1.52% disulfide was stranded with difficulty.

Each composition was cured by heating at 260° C. in a forced air oven. A pronounced decrease in melt flow was noted with cure times greater than 1 hour; optimum melt flow conditions were obtained at curing times of 4–6 hours.

Samples comprising about 100 mg. of each uncured and cured composition were placed between two pieces of polytetrafluoroethylene-coated foil held between two stainless steel plates, placed in a Carver press preheated to 300°–310° C., equilibrated for 1 minute and pressed at 1050 kg./cm.$^2$. The pressure was released and the polymer and foil sheets were immediately quenched in a water bath to prevent crystallization of the PPS chains, after which they were subjected to quantitative infrared analysis which showed, in each instance, the presence of amino groups. It is thus apparent that the amine functionality was not lost upon curing, although the proportion thereof decreased slightly.

EXAMPLE 4

A mixture of 62.58 grams (252 mmol.) of bis(4-aminophenyl) disulfide, 96.84 grams (504 mmol.) of trimellitic anhydride and 400 ml. of glacial acetic acid was heated under reflux for 2½ hours, with stirring and removal of water and acetic acid by distillation. An additional 200 ml. of acetic acid was added and the vessel was fitted with a trap filled with 4A molecular sieves, and refluxing was continued for 1½ hours. Upon filtration, a yellow crystalline solid was obtained; after washing with acetic acid and drying, the yield of product was 143 grams (95.1% of theoretical). Mass spectrometric analysis showed the product to comprise principally 4,4'-bis(4-carboxyphthalimidophenyl) disulfide, with a small proportion of the corresponding trisulfide.

A mixture of 10 grams of PPS and 401 mg. of the above-described disulfide was heated with 1-chloronaphthalene at 250° C. for 2 hours, with stirring. The solution was cooled and the precipitated polymer was filtered, washed with acetone and dried; total yield was 94.6% of theoretical.

A portion of the polymer was extracted with dimethylacetamide to remove unreacted disulfide, compression-molded and quenched as described in Example 3. The Fourier transform infrared spectrum thereof showed the presence of imide and carboxylic acid groups. Upon comparison with a standard of known functionality, it was found that 41% of the carboxylic acid functionality was attached to PPS chains.

EXAMPLE 5

A mixture of 1.998 grams of PPS and 80 mg. of the disulfide of Example 4 was thoroughly blended and heated in a screw-capped test tube under nitrogen at 310° C. for 10 minutes, after which the test tube was quenched in cold water. The product was dissolved in 1-chloronaphthalene at 220° C., precipitated by cooling the solution and removed by filtration. Infrared spectroscopic analysis before and after extraction with dimethylacetamide showed that 100% of the carboxy functionality was attached to PPS chains.

EXAMPLE 6

A mixture of 750 grams of PPS and 15 grams of the disulfide of Example 4 was extruded on a single-screw extruder at temperatures in the range of 270°–290° C. The extrudate, a brittle brown solid, was shown by Fourier transform infrared spectroscopy to contain carboxyphthalimido groups.

EXAMPLE 7

The procedure of Example 6 was repeated, employing 1.5 kg. of PPS and 15 grams of the disulfide. The extrudate had a lower melt flow value, was less brittle than that of Example 6 and could be continuously stranded and cut into pellets.

EXAMPLE 8

A mixture of 23.91 grams (96.3 mmol.) of bis(4-aminophenyl) disulfide, 100 ml. of toluene and 247 ml. of m-cresol was stirred at room temperature and 124.07 grams (385.1 mmol.) of 3,3',4,4'-tetracarboxybenzophenone dianhydride and 147 ml. of toluene were added over 20 minutes, with continued stirring. A further 50 ml. of toluene and 50 ml. of m-cresol were added and the mixture was heated under reflux for 2 hours, with partial distillation of the toluene. The vessel was then fitted with a trap filled with 4A molecular sieves and heating was continued for 1 hour. The mixture was poured into 2 liters of toluene and the solid which precipitated was separated by filtration and washed with toluene and several times with acetone. The desired 4,4-bis[4-(3,4-dicarboxybenzoyl)phthalimidophenyl] disulfide dianhydride was obtained in the amount of 66.83 grams (86.4% of theoretical). It melted at 160°–180° C.

A solid mixture of 2 grams of PPS and 79 mg. of the above-described disulfide was heated in a nitrogen atmosphere at 310° C. for 10 minutes, and was then rapidly cooled by dipping in cold water. The product was dissolved in 15 ml. of 1-chloronaphthalene at 220° C., immediately cooled, washed with acetone and dried in vacuum at 80° C.

A portion of the product was compression molded as described in Example 3. A Fourier transform infrared spectrum thereof showed the presence of imide and anhydride carbonyl groups.

A second portion was extracted with dimethylacetamide in a Soxhlet extractor and similarly molded and analyzed. A comparison of the imide band with that of the unextracted material indicated 100% functionalization.

EXAMPLE 9

A solution of 124.65 grams (387 mmol.) of benzophenone-3,3',4,4'-tetracarboxylic acid dianhydride in 400 ml. of o-dichlorobenzene was heated at 180° C. as 24.02 grams (96.7 mmol.) of bis(4-aminophenyl) disulfide and 100 ml. of o-dichlorobenzene were added portionwise. The mixture was heated under reflux for 2 hours with removal of water by distillation.

Upon cooling the solution to room temperature, a solid separated which was collected by filtration, washed with cyclohexane and dried. It was heated under reflux with excess methanol and cooled, whereupon it again precipitated. The precipitate was removed by filtration and washed with methanol, yielding 77.66 grams (98% of theoretical) of the desired 4,4'-bis[4-(3,4-dicarboxybenzoyl)phthalimidophenyl] disulfide dimethyl ester. Elemental analysis showed the presence of 6.8% sulfur (theoretical amount 7.0%).

A mixture of 1.5 kg. of PPS and 30 grams of the above-described disulfide was extruded on a single-screw extruder at temperatures in the range of 300°–314° C. A portion of the extrudate was pulverized and extracted with dimethylacetamide for 7 hours in a Soxhlet extractor, after which it was analyzed by Fourier transform infrared spectroscopy which indicated 96% functionalization.

The product was cured by heating in a forced air oven for 3 hours at 260° C., causing a decrease in melt flow from 140 to 100 g./10 min. This decrease is an indication of an increase in molecular weight.

EXAMPLE 10

An intimate mixture of 1.5 kg. of PPS and 15 grams of bis[4-(4-carboxyphthalimido)phenyl] disulfide, prepared by the reaction of bis(4-aminophenyl) disulfide with trimellitic anhydride, was extruded on a single-screw extruder at 260°–290° C. The extrudate was cured at 260° C. in a forced air oven for one hour. The cured carboxy-functionalized PPS had a melt flow at 310° C. and 1 kg. load of 1.2 g./10 min., as compared with 5.1 g./10 min. for the original PPS.

It is known that polyarylene sulfides can be "cured" by heating in contact with an oxygen-containing gas (usually air) at temperatures above about 200° C., resulting in a substantial decrease in melt flow and, apparently, a concomitant increase in molecular weight. While the exact nature of the curing reaction is not known, it appears to involve branching and/or chain extension, which probably occurs thermally or by oxidation of some type. The polyarylene sulfides employed according to the invention may be cured, typically in the solid or liquid state at temperatures in the range of about 225°–350° C. for time periods of about 2–6 hours.

In most instances, the preferred functional groups on the polyarylene sulfide are amino groups and especially primary amino groups. It is frequently found that commercially available polyarylene sulfides prepared by conventional methods contain a measurable proportion of such amino groups even if one of the above-described methods of preparation is not employed. This is probably a result of incorporation in the molecule of moieties derived from nitrogen-containing solvents such as N-methyl-2-pyrrolidone.

The precise proportion of epoxide-reactive functional groups which must be present on the polyarylene sulfide can readily be determined by simple experimentation. All that is required is the preparation and analysis of a reaction product with a polyphenylene ether containing epoxy groups. If a substantial proportion of copolymer formation is detected, it may be assumed that the required functional groups were present in the necessary proportion on the polyarylene sulfide.

In general, some degree of copolymer formation in accordance with the invention is observed if the nitrogen content of the polyarylene sulfide is above about 800 ppm., even if no detectable proportion of amino nitrogen is present. The reasons for this are not fully understood. Preferable nitrogen proportions are in the range of about 1200–3000 ppm., since a favorable tendency toward copolymer formation is often observed in that range.

For the most part, the compositions of this invention contain homopolymeric polyphenylene ether and polyarylene sulfide in addition to copolymer. The presence of homopolymer is not detrimental, since the copolymer present acts as a compatibilizer for the homopolymeric constituents.

The approximate proportion of copolymer present may be determined by dissolving the composition in hot 1-chloronaphthalene, cooling to precipitate a solid of high surface area and extracting said solid with chloroform. Assuming that the undissolved material in excess of the amount of polyarylene sulfide originally employed represents copolymerized polyphenylene ether, and further that said copolymerized polyphenylene ether is bound to an equal weight of polyarylene sulfide, the proportion of copolymer may be determined by doubling the weight of copolymerized polyphenylene ether and dividing by the weight of polymers originally employed. This value is converted to percent and corrected by subtracting the value obtained in a control by similar treatment of the epoxy-functionalized polyphenylene ether alone.

The compositions of this invention are prepared by melt blending of the above-described polyphenylene ether and polyarylene sulfide. Any known melt blending method may be employed, including the use of batch and continuous devices. Extrusion is a common and often preferred melt blending method. Typical melt blending temperatures are in the range of about 200°–350° C.

It is frequently found that the heat distortion temperatures of the compositions of this invention are markedly increased upon annealing the composition at a temperature in the range of about 175°–250° C. At the same time, other properties such as impact strength, tensile strength and tensile elongation may be degraded somewhat. Compositions, particularly in the form of molded articles, which have been annealed in this manner are within the scope of the invention.

The invention also includes compositions containing elastomeric impact modifiers compatible with either or both of the polyphenylene ether and the polyphenylene sulfide.

Impact modifiers for polyphenylene ethers are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof.

Olefin polymers and copolymers employable in the invention include low density polyethylene, high density polyethylene, linear low density polyethylene, isotactic polypropylene, poly(l-butene), poly(4-methyl-l-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers.

The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers include polystyrene-polybutadiene (SBR), polystyrene-polyisoprene and poly(α-methylstyrene)-polybutadiene. Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrene-polyisoprene-polystyrene (SIS), poly(α-methylstyrene)polybutadiene-poly(α-methylstyrene) and poly(α-methylstyrene)-polyisoprene-poly(α-methylstyrene). Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester and ether-amide elastomers.

The proportion of impact modifier or other resinous material is subject to wide variation. Impact modifiers such as diblock or triblock copolymers are usually present in an amount up to about 50 parts per 100 parts of polyphenylene ether.

The presence of other conventional materials in the compositions of this invention is also contemplated. They include fillers, inhibitors, mold release agents and the like. Fibrous fillers, such as glass, graphite or polyamide fibers, are often employed, with glass fibers frequently being preferred because their presence may further increase the heat distortion temperature of the composition. The proportion of fibrous filler in the composition is usually up to about 30% by weight, based on total composition.

In the following examples illustrating the invention, the polyarylene sulfides employed were polyphenylene sulfides having the following characteristics, with melt flows being values for 10 minutes determined at 300° C. and 5 kg. load:

LMW—uncured, prepared by conventional PPS process, about 1000 ppm. nitrogen, melt flow greater than 600 g.

HMW—linear PPS with lower melt flow than that of LMW.

BL—lightly cured PPS prepared with the incorporation of a branching agent, about 1000 ppm. nitrogen.

AF—prepared with the incorporation of amine groups by employment of 3,5-dichloroaniline as comonomer, nitrogen content about 2500 ppm.

TAF—prepared with the incorporation of amine groups by employment of 3,5-diaminochlorobenzene as an endcapping agent, about 1800 ppm. nitrogen.

CAF—cured AF, about 1900 ppm. nitrogen.

CTAF—cured TAF, about 1500 ppm. nitrogen.

All parts and percentages in the following examples are by

EXAMPLES 11-17

Dry blends of 32.5 parts of the product of Example 1, 55 parts of PPS and 12.5 parts of a commercially available triblock copolymer with polystyrene end blocks having weight average molecular weights of 29,000 and a hydrogenated butadiene midblock having a weight average molecular weight of 116,000 were mixed in a jar mill and extruded on a corotating, intermeshing twin-screw extruder at temperatures from 130° to 290° C., with vacuum venting. The extrudates were quenched in water, pelletized, dried in a circular air oven at 100°-110° C. and molded into test specimens which were then tested for notched Izod impact strength (ASTM method D256), unnotched Izod impact strength (modification of ASTM method D256), tensile properties (ASTM method D638), flexural properties (ASTM method D790) and heat distortion temperature at 1.8 MPa. (ASTM method D648). Certain compositions were also analyzed for copolymer proportion, using the method previously described. The results are given in Table I.

TABLE I

| | Example | | | | | | |
|---|---|---|---|---|---|---|---|
| | 11 | 12 | 13 | 14 | 15 | 16 | 17 |
| PPS | LMW | CL | BL | AF | CAF | TAF | CTAF |
| PPS-polyphenylene ether copolymer, % | 3 | — | — | 5 | — | 1 | 15 |
| Tensile strength at break, MPa. | 32.4 | 51.7 | 41.4 | 44.1 | 52.4 | 51.0 | 51.7 |
| Tensile elongation, % | 2.7 | 6.0 | 3.4 | 4.9 | 5.6 | 7.8 | 9.7 |
| Flexural strength, MPa. | 73.1 | 97.2 | 86.2 | 80.0 | 85.5 | 82.0 | 84.8 |
| Flexural modulus, GPa. | 2.4 | 2.6 | 2.4 | 2.2 | 2.3 | 2.3 | 2.4 |
| Unnotched Izod impact strength, joules/m. | 229.6 | NB* | 405.8 | 678.2 | 662.2 | NB* | NB* |
| Heat distortion temp., °C. | 124 | 134 | 125 | 122 | 116 | 117 | 121 |

*Test specimen bent but did not break.

EXAMPLES 18-23

Certain of the test specimens of Examples 11-17 were annealed at 200° C. for 1 hour and again tested. The results are given in Table II.

TABLE II

| | Example | | | | | |
|---|---|---|---|---|---|---|
| | 18 | 19 | 20 | 21 | 22 | 23 |
| Product example | 11 | 13 | 14 | 15 | 16 | 17 |
| Tensile strength at break. MPa. | 29.0 | 33.8 | 38.6 | 50.3 | 53.8 | 55.8 |
| Tensile elongation, % | 2.4 | 3.2 | 3.7 | 4.6 | 7.2 | 7.5 |
| Flexural strength, MPa. | 58.6 | — | 73.8 | 71.0 | 84.8 | 89.6 |
| Flexural modulus, GPa. | 2.3 | — | 2.1 | 2.3 | 2.2 | 2.4 |
| Unnotched Izod impact strength, joules/m. | 160.2 | — | NB | NB | NB | NB |
| Heat distortion temp., °C. | 173 | 164 | 168 | 162 | 168 | 163 |

EXAMPLES 24-27

Compositions similar to those of Examples 11-17, but not containing impact modifier, were prepared from various proportions of the product of Example 1 and CL. Their properties are given in Table III.

TABLE III

| | Example | | | |
|---|---|---|---|---|
| | 24 | 25 | 26 | 27 |
| Example 1, parts | 45 | 50 | 55 | 60 |
| PPS, parts | 55 | 50 | 45 | 40 |
| Tensile strength at break, MPa. | 44.1 | 32.4 | 40.7 | 57.2 |
| Tensile elongation, % | 1.8 | 1.3 | 1.6 | 3.1 |
| Flexural strength, MPa. | 90.3 | 69.6 | 68.3 | 93.1 |
| Flexural modulus, GPa. | 3.2 | 3.2 | 3.2 | 3.1 |
| Unnotched Izod impact strength, joules/m. | 149.5 | 122.8 | 133.5 | 176.2 |
| Heat distortion temp., °C. | 149 | 165 | 166 | 187 |

It will be seen that omission of the impact modifier causes an increase in heat distortion temperature at the expense of impact strength.

EXAMPLES 28-31

Following the procedure of Examples 11-17, blends were prepared from 50 parts of the composition of Example 1, parts of CL and 10 parts of various ethylene-(meth)acrylate copolymers, identified as follows:

Example 28 —ethylene-methacrylic acid copolymer, with 12% converted to the zinc salt.

Example 29 —ethylene-methacrylic acid copolymer, with 41% converted to the sodium salt.

Example 30 —ethylene-acrylic acid copolymer, melt flow 10 g./10 min.

Example 31 —ethylene-acrylic acid copolymer, melt flow 5 g./10 min.

The results are given in Table IV.

TABLE IV

| | Example | | | |
|---|---|---|---|---|
| | 28 | 29 | 30 | 31 |
| Tensile strength, MPa.: | | | | |
| At yield | 54.4 | 54.8 | — | — |
| At break | 53.0 | 53.6 | 47.4 | 48.6 |
| Tensile elongation, % | 5.5 | 5.0 | 4.4 | 4.4 |
| Flexural modulus, GPa. | 2.2 | 2.2 | 2.2 | 2.2 |
| Unnotched Izod impact strength, joules/m. | 598.1 | 421.9 | 315.1 | 475.3 |
| Heat distortion temp., °C. | 149 | 143 | 138 | 151 |

EXAMPLES 32-35

The procedure of Examples 11-17 was employed to prepare blends of 32.5 parts of the product of Example 1, 12.5 parts of impact modifier and 55 parts of HMW. In Examples 32, 34 and 35, the impact modifier of Examples 11-17 was employed; in Example 33, the impact modifier was a commercially available epoxy-functionalized polyethylene. The relevant parameters and test results are given in Table V.

TABLE V

| | 32 | 33 | 34 | 35 |
|---|---|---|---|---|
| PPS-polyphenylene ether copolymer, % | 16.6 | — | — | — |
| Tensile strength, MPa.: | | | | |
| At yield | 50.8 | 49.2 | — | — |
| At break | 48.9 | 48.9 | 51.6 | 53.4 |
| Tensile elongation, % | 22.7 | 22.0 | 4.7 | 5.2 |
| Flexural modulus, GPa. | 2.3 | 2.0 | 2.2 | 2.2 |
| Izod impact strength, joules/m.: | | | | |
| Unnotched | 854.4 | 854.4 | 464.6 | 624.8 |
| Notched | 80.1 | 320.4 | 26.7 | 21.4 |
| Heat distortion temp., °C. | 134 | 107 | 141 | 149 |

EXAMPLE 36

Following the procedure of Examples 11-17, a composition containing 63 parts of HMW and 37 parts of the product of Example 1, but no impact modifier, was prepared. It had the following properties:

Tensile strength at break—71.6 MPa.
Tensile elongation—4.8%.
Flexural modulus—3.2 GPa.
Unnotched Izod impact strength—427.2 joules/m.
Notched Izod impact strength—10.7 joules/m.
Heat distortion temperature—144° C.

EXAMPLES 37-38

Two compositions were prepared containing 32.5 parts of the product of Example 1, 12.5 parts of the impact modifier of Examples 11-17 and various proportions of HMW and glass fiber, the latter being preblended with a portion of the HMW to form a concentrate which was then blended with the remaining constituents. The relevant proportions and properties are listed in Table VI.

TABLE VI

| | Example | |
|---|---|---|
| | 37 | 38 |
| PPS, parts | 50 | 45 |
| Glass fiber, parts | 5 | 10 |
| Tensile strength, MPa.: | | |
| At yield | 54.4 | 59.3 |
| At break | 54.0 | 58.9 |
| Tensile elongation, % | 6.9 | 6.4 |
| Flexural modulus, GPa. | 2.7 | 3.4 |
| Heat distortion temp., °C. | 2.7 | 3.4 |
| Unnotched Izod impact strength, joules/m. | 688.9 | 523.3 |

EXAMPLE 39

Following the procedure of Examples 11-17, a bland was prepared from 55 parts of the product of Example 10, 32.5 parts of the product of Example 1 and 12.5 parts of the triblock copolymer. It was shown upon analysis to contain about 36.7% PPS-polyphenylene ether copolymer.

What is claimed is:

1. A composition comprising polyphenylene ether-polyarylene sulfide copolymer molecules, said composition being prepared by melt blending a polyphenylene ether containing epoxy groups with a polyarylene sulfide containing epoxide-reactive functional groups.

2. A composition according to claim 1 wherein the polyphenylene ether is a poly(2,6-dimethyl-1,4-phenylene ether).

3. A composition according to claim 2 wherein the polyphenylene ether is an epoxytriazine-capped polyphenylene ether.

4. A composition according to claim 3 wherein the polyarylene sulfide is a polyphenylene sulfide.

5. A composition according to claim 4 wherein the epoxide-reactive groups are amino groups.

6. A composition according to claim 5 which also contains an elastomeric impact modifier.

7. A composition according to claim 4 wherein the polyphenylene sulfide is a cured polyphenylene sulfide.

8. A composition according to claim 7 which also contains an elastomeric impact modifier.

9. A composition according to claim 4 wherein the polyphenylene ether has end groups of the formula

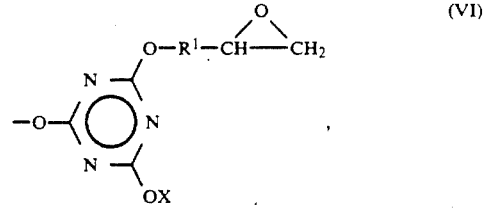

(VI)

wherein X is an alkyl, cycloalkyl or aromatic radical or

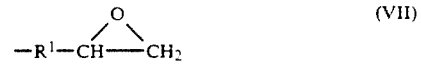

(VII)

and $R^1$ is a divalent aliphatic, alicyclic, heterocyclic or unsubstituted or substituted aromatic hydrocarbon radical.

10. A composition according to claim 9 wherein $R^1$ is methylene.

11. A composition according to claim 10 wherein X is 2,4,6-trimethylphenyl.

12. A composition according to claim 11 which also contains an elastomeric impact modifier.

13. A composition according to claim 4 which has been annealed at a temperature in the range of about 175°–250° C.

14. A composition according to claim 13 wherein the polyarylene sulfide is a polyphenylene sulfide.

15. A composition according to claim 14 wherein the epoxide-reactive groups are amino groups.

16. A composition according to claim 15 which also contains an elastomeric impact modifier.

17. A composition according to claim 15 wherein the polyphenylene sulfide is a cured polyphenylene sulfide.

18. A composition according to claim 15 wherein the polyphenylene ether has end groups of the formula

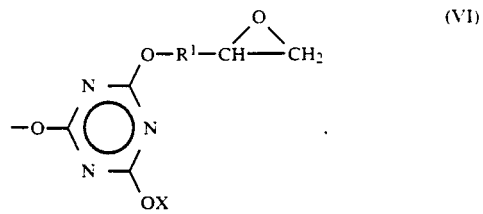
(VI)

wherein X is an alkyl, cycloalkyl or aromatic radical or

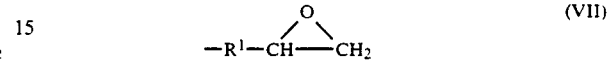
(VII)

and $R^1$ is a divalent aliphatic, alicyclic, heterocyclic or unsubstituted or substituted aromatic hydrocarbon radical.

19. A composition according to claim 18 wherein $R^1$ is methylene.

20. A composition according to claim 19 wherein X is 2,4,6-trimethylphenyl.

21. A composition according to claim 20 which also contains an elastomeric impact modifier.

* * * * *